Nov. 30, 1948.  J. HARRINGTON  2,454,798
CENTRIFUGAL SEPARATION OF SOLIDS
ACCORDING TO SPECIFIC GRAVITY
Filed March 21, 1945  2 Sheets-Sheet 1
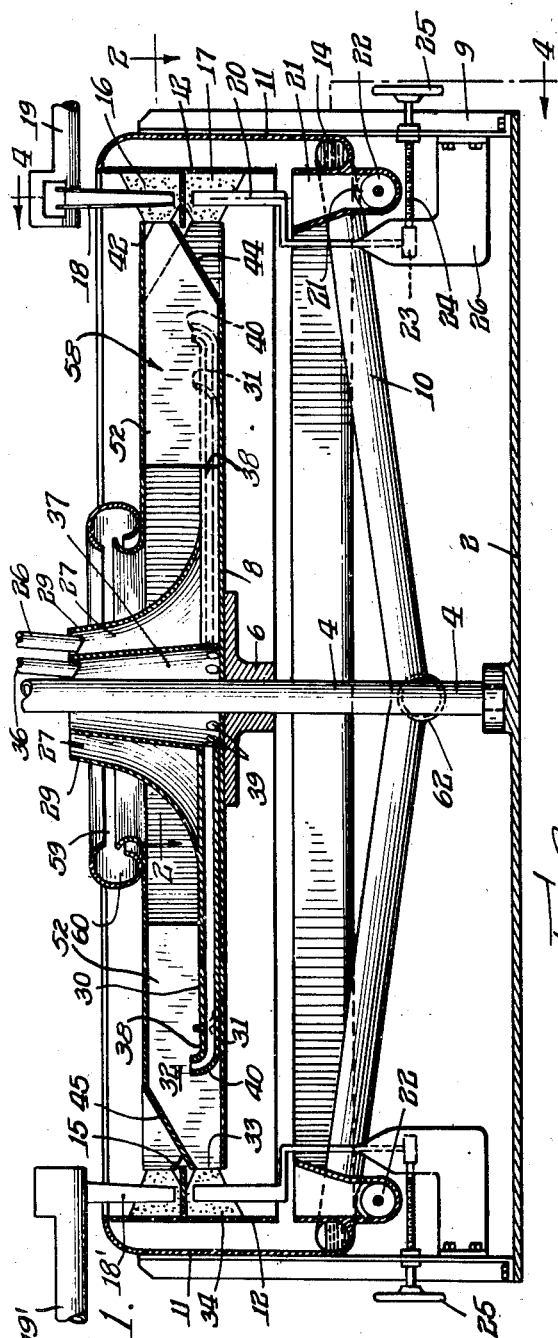
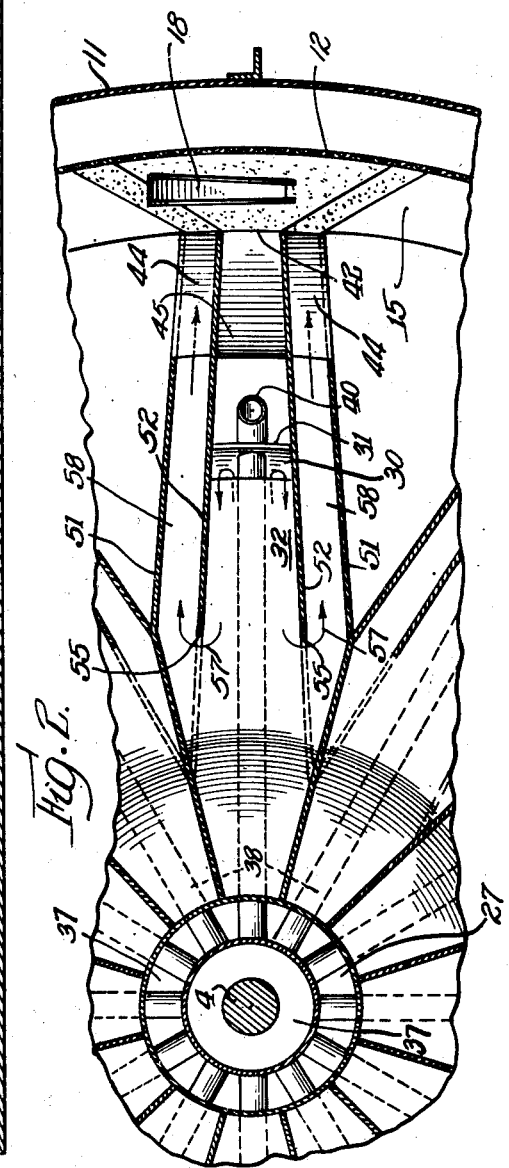
INVENTOR.
Joseph Harrington
BY
Loftus, Moore, Olson & Trexler
Attys.

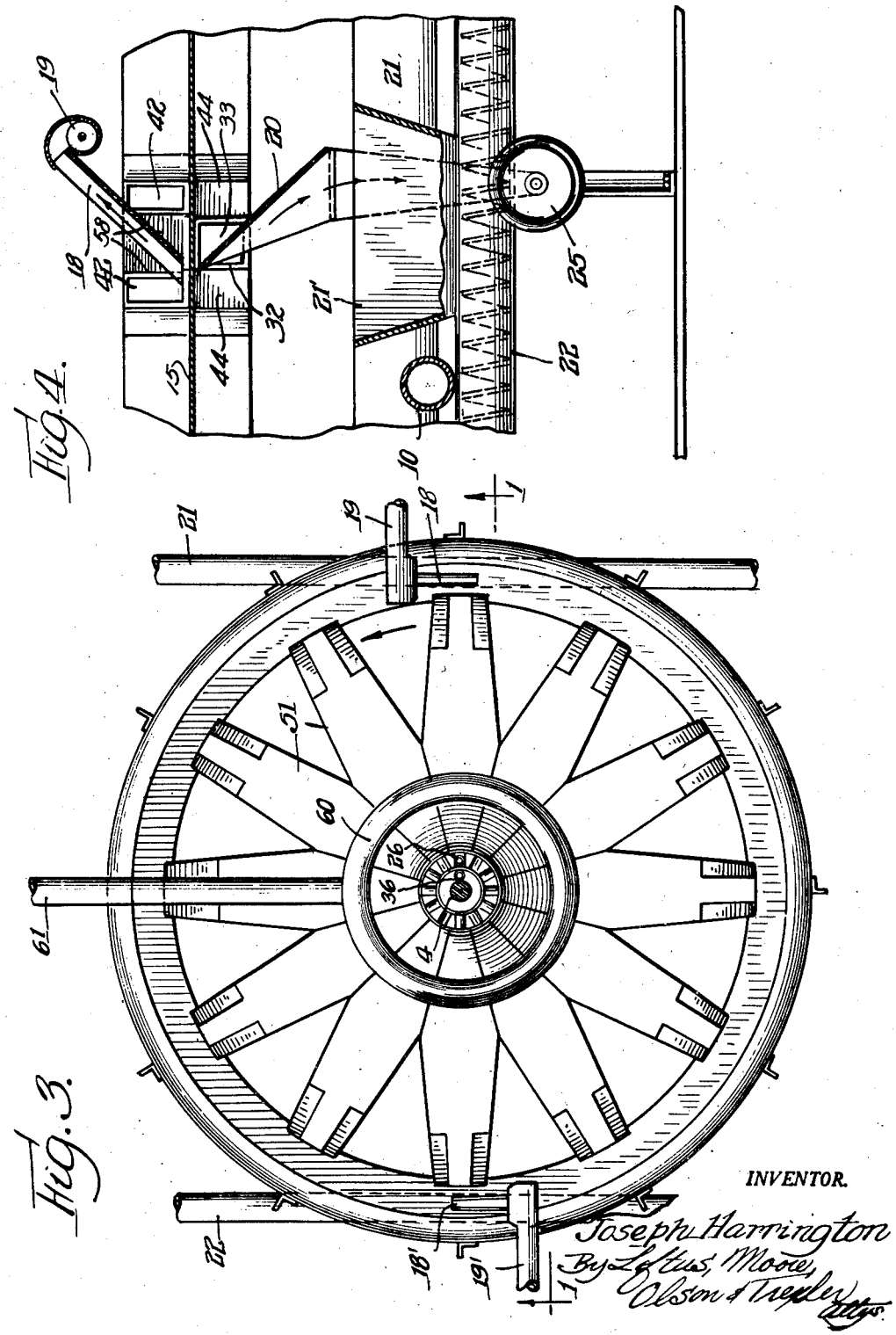

Patented Nov. 30, 1948

2,454,798

UNITED STATES PATENT OFFICE 2,454,798

CENTRIFUGAL SEPARATION OF SOLIDS ACCORDING TO SPECIFIC GRAVITY

Joseph Harrington, Riverside, Ill.

Application March 21, 1945, Serial No. 583,953

3 Claims. (Cl. 209—155)

This invention relates to the separation of good fine coal or "fines" and other minerals on the dumps of the various mines, from heavy impurities which are intimately mixed therewith. By "fines" is meant coal of less than one quarter inch in diameter.

An object of the present invention is to effect separation of fines from the accompanying heavier impurities by a novel process which entails mixing the materials to be separated with sufficient water or other liquid vehicle in a rotary chamber or compartment to insure effective separation thereof by centrifugal methods, causing the heavier impurities to be cast out of the chamber by centrifugal force against a screen or like member in a continuous stream involving outward movement of a portion of the liquid through the screen, collecting the heavy impurities deposited on the screen, producing a backed-up flow of the remaining liquid and the fines into a separate rotary chamber centrifuging the mixture from the latter chamber, and effecting separation of the liquid from the fines by screening the mixture as it is centrifuged from this second chamber.

Another object of this invention is the provision of various improvements in known processes and apparatus for centrifugally separating solids according to their specific gravities whereby a liquid mixed with solids of different specific gravities is centrifuged from a rotary separation chamber at a limited rate sufficient to maintain an adequate flow of only the denser particles from the chamber, and the remainder of the liquid vehicle, augmented by a controlled additional flow of liquid, is backed up and forced to flow counter to the centrifugal force acting thereon, carrying along with it the particles having relatively low density, and is directed into another chamber wherein the mixture is centrifuged against a screen which effects separation of these light particles from the liquid.

These and other objects of invention will be apparent from a perusal of the following specification when taken in connection with the accompanying drawings, wherein:

Figure 1 is a sectional view showing one form of the invention;

Figure 2 is a partial plan view taken on the line 2—2 of Figure 1;

Figure 3 is a plan view of the device shown in Figure 1; and

Figure 4 is a section on the line 4—4 of Figure 1.

Mounted on a foundation plate 2 is a vertical, rotatable shaft 4 to which is attached a central spider or collar 6 supporting in turn a horizontal plate or disc of circular form 8. This latter plate rotates and forms the base of the centrifugal table upon which the various radial compartments of the centrifugal device are arranged and constructed. At the periphery of base plate 2 are a series of vertical angular supports 9 which serve to support the stationary structure 11 which serves as a means of catching the water which is thrown through the rotating screen 12, collecting the water therefrom into a suitable trough 14 for ultimate disposal. This may be by means of any type of down spout connected to the bottom of this circular trough 14.

The screen 12 and the various radial compartments are rigidly attached to base plate 8 and rotate synchronously therewith. The screen 12 is divided by a horizontal, inwardly extending partition 15 which extends annularly around the device in such manner as to keep separate the clean coal at point 16 and the heavy refuse at point 17. The removal of the coal which is deposited on the screen at point 16 is effected by an adjustable trough or scoop 18, see Figure 4, which lifts the coal from its point of deposit upon screen 16 to a suitable conveying apparatus 19. Similarly, the heavy waste or refuse at point 17 is scooped off of its point of deposit on screen 12 by means of scoop 20. This causes the waste material to fall into the open-mouthed receptacle 21 with a screw conveyor or other suitable device 22 at the bottom thereof. The scoop 20 is supported on a nut 23 travelling on the threaded rod 24 operated by hand wheel 25. The standard 26 supports the inner end of threaded shaft 24. When the hand wheel 25 is turned the nut 23 travels along the threaded member 24 and causes a radial movement of the scoop 20. As the scoop 20 moves outwardly from the center toward the screen 12 it will scoop greater quantities of the refuse from the rotating screen. The amount scooped is in direct proportion to the outward radial adjustment of this scoop relatively to the rotating screen. In other words, the farther radially outwardly the scoop is adjusted in a direction toward the screen, the more of the fluid refuse is removed by the scoop. The mesh of the screen 12 is such that the screen will retain thereon all coal of merchantable size and allow to pass therethrough the extreme fines, et cetera.

The coal and refuse reach points 16 and 17 in the following manner. The raw material, consisting of the coal with its admixed impurities of clay, shale, gravel and pyritic sulphur, reaches the centrifuge through pipe 26 suspended in a stream of water so that the entire mass is fluid. This material enters compartment 27 formed by the bottom plate of the structure 8 and the curved partitions 29 of each radial compartment, see Figure 1. The base plate and the partition 29 from a compartment which conveys the fluid sludge to a point of exit 30. At this point they are deflected upwardly by means of a curved lip 31 into compartment 32. At this point the separation of the heavier and lighter gravity materials begins. Under normal conditions of material suspended in water, the centrifugal force compels the heavy material to flow outwardly or radially toward the exit 33, see Figure 1, where it flows against the screen 12 as shown in the dappled portion 34 of Figure 1. This will take place below the partition 15. The pipe 36, from an adequate source of water supply, conveys clear water to and through compartment 37 and through a pipe 38 and communicating therewith through the openings 39 at the bottom of the radial compartment. This clear water is conveyed to a nozzle 40 more distant from the axis of rotation than point 30. The nozzle 40 empties into compartment 32 which has the aforesaid outlet 33 disposed opposite the screen 12.

The screen 12 is perforated so that only a sufficient portion of water will flow therethrough for the purpose of keeping the mixture of water and denser particles sufficiently fluid to flow through the opening 33 and reach the screen 12. The mesh of this screen should be of sufficient magnitude to permit a constant outflow of the material and thereby prevent congestion at the orifice 33. A size of mesh between 20 and 60 meshes per inch will be found adequate for this purpose. If there were no water going through the screen 12 the solid material would compact so hard in the orifice 33 that it might not flow therethrough, but by virtue of being thoroughly wet or even suspended in water, it has sufficient fluidity to flow when the apertures of the screen are arranged to pass sufficient water for this purpose. The major portions of the water entering through pipe 26 and also through the pipe 36 combine in the compartment 32 and then flow radially inwardly toward the axis 4 of the machine. In this connection, the mesh of the screen 12 should not be so great as to require an excessive amount of water in the compartment 32 in order to provide the counterflow toward the axis.

At this point the fundamental principle of the operation of the machine occurs. The velocity of the water toward the axis 4, determined by the controllable amount entering through pipe 36, is just sufficient to carry with it against centrifugal force the lighter portion, which is the coal, but not to carry with it the heavier impurities of much higher specific gravity. The latter, therefore, continue radially outwardly toward the screen and by virtue of the construction of these compartments are deposited below the division plate 15 upon the screen 12. To this end therefore, the top of each compartment 32 is sloped downwardly as at 45 to deflect the heavier components outwardly through the opening 33 to a point below the annular horizontal division plate 15, from which they are scooped off by the previously described scoop 20.

It is to be noted that while there are but two oppositely disposed troughs for the removal of the material on screen 12 it must be appreciated that the rapid rotation of the entire structure and the multiplicity of radial compartments provides a virtually continuous flow of material from the screens through the inclined troughs and to the conveyors for ultimate disposal. This makes the entire process substantially continuous and the movement of the raw material and the separated solids a continuous flow.

In plan view, see Figure 2, the numerous radial compartments, one of which only will be described, are formed by outside plates 51 and contain the inner plates 52 which subdivide the compartment into three portions. The center portion is the same as 32 above described and is that part of the compartment in which the separation of the heavier and lighter particles takes place, the heavier particles moving radially outward toward the screen to discharge opening 33.

The flow of the water toward the center is sufficiently rapid so that the lighter portions, which are the particles of coal, are carried toward the axis through compartment 32, the heavier portions moving radially outward at this point effecting the separation of the heavier and the lighter parts. The lighter portion, which is the coal, is conveyed in a radially inward direction to the point where the center partitions 52 terminate, as at 55. At this point the cross section of the entire compartment suddenly doubles, which results in an instantaneous slow-down of the velocity of the current which produces a velocity insufficient to carry the coal further inwardly against the action of the centrifugal force. It therefore immediately flows around the edges of the partitions, as shown by the arrows 57, into the outer compartments 58. At this point the direction of water flow, plus the action of centrifugal force, rapidly causes the coal to move radially outwardly.

As previously stated, screen 12 is perforated only to the extent of allowing some water to pass to maintain reasonable fluidity in the material thereon, the bulk of the water flowing toward the axis until it overflows the curved lip 59, see Figure 1, and from there into the annular collecting trough 60, from which it flows through pipe 61, best seen in Fig. 3, to the point of disposal. The annular trough 14 is provided with a discharge pipe 62 for carrying off that part of the water which passes through the screen. The bottom of each compartment 58 is sloped upwardly as indicated at 44 to divert the mixture of water and light particles through the discharge opening 42 against that portion of the screen 12 which is located above the horizontal dividing partition 15. The water passes through the screen 12, leaving the fine coal deposited as shown at 16 on the screen where it is removed by the scoops as 18. If desired, the mesh of that portion of the screen 12 which is above the partition 15 may be different from the screen mesh below the partition 15, but generally this is not necessary.

Referring to Figure 3, screw conveyors 22 are tangentially disposed at opposite sides of the machine in such manner as to collect the solid materials deposited therein and convey them to a convenient point.

Obviously the invention is not limited to the specific details of construction disclosed herein but is capable of other modifications and changes without departing from the spirit and scope of the appended claims.

Having thus described my invention, what I claim as new and desire to secure by Letters Patent is:

1. In a device of the class described, in combination with a rotatable turret or head, a pair of screens disposed concentrically about and spaced from the edge of said turret, said turret being provided with a series of spaced apart, radial channels, means providing a series of chambers in said channel, said chambers opening at the outer periphery of the turret adjacent one of said screens, means providing a horizontal imperforate partition dividing said chamber and screens into screened compartments, means for delivering liquid carrying solids of different specific gravities therein to said turret to cause said turret to centrifuge said liquids into said chambers, means for delivering controlled additional liquid to said chambers in sufficient amounts whereby the major portion of the liquid in said chambers will not pass through one of said screens but will back up in said chambers and flow inwardly toward the center of rotation of the turret, means disposed between said chambers and the axis of rotation of said turret for conducting said backed up liquid into a channel that is separate from said chamber, means for delivering said backed up liquid carrying the lighter constitutent to said second screen under the influence of centrifugal force created by said turret for causing said liquid to pass through said second screen and said lighter constituent to be retained by said second screen, and means for collecting said last mentioned retained constituent from said second screen.

2. The method of separating dense solids from light solids in a centrifugal apparatus which comprises introducing a mixture of liquid and both said solids in a finely divided state into a rotary compartment of the apparatus, centrifuging the liquid from the compartment at a limited rate sufficient to maintain outward flow of the dense solids, screening the dense solids from the centrifuged liquid and continuously removing the dense solids collected, supplying additional liquid to the compartment whereby the rate at which liquid is introduced into the compartment is substantially in excess of that at which the liquid is centrifuged therefrom, constraining the bulk of the liquid and the light particles mixed therewith to flow in a direction counter to the centrifugal force acting thereon, reducing the pressure of the counter-flowing liquid after a predetermined amount of travel thereof, thereafter centrifuging the mixture of liquid and light particles, screening the light particles from the centrifuged liquid, and continuously removing the light particles collected.

3. The herein described apparatus comprising a rotary table, said rotary table being provided with a plurality of spaced apart radial channels, means providing a series of chambers in said channels, a screen surrounding and spaced from the periphery of said table, a horizontal partition dividing said screen into separate compartments, means for introducing a carrying liquid containing solids of two different specific gravities onto said table whereby under said centrifugal effect the liquid is centrifuged through said chambers and into one of said compartments, said second compartment having a mesh adapted to pass only a portion of said centrifuged liquid but to retain the heavier solids from passing therethrough, means for withdrawing said heavier solids from the surface of said screen, means for introducing liquid onto said table at a point inwardly of the screen whereby to cause said liquid carrying solids of lighter specific gravities to counter-flow toward the axis of said rotating surface while permitting the solids of heavier specific gravity to continue to be centrifuged into the first screen compartment, means for diverting the counter-flowing liquid whereby said counter-flowing liquid may be centrifuged into the second of said screen compartments which is designed to collect the relatively lighter solids while passing the liquid therethrough, and means for continuously removing the relatively lighter solids from said second screen compartment.

JOSEPH HARRINGTON.

REFERENCES CITED

The following references are of record in the file of this patent:

UNITED STATES PATENTS

| Number | Name | Date |
| --- | --- | --- |
| 468,688 | Peck | Feb. 9, 1892 |
| 842,614 | Blass | Jan. 29, 1907 |
| 957,478 | Simpson | May 10, 1910 |
| 1,374,098 | Peck | Apr. 5, 1921 |
| 1,519,419 | Peck | Dec. 16, 1924 |

FOREIGN PATENTS

| Number | Country | Date |
| --- | --- | --- |
| 108,325 | Great Britain | Mar. 6, 1919 |